United States Patent
Yoon et al.

(10) Patent No.: US 6,628,971 B1
(45) Date of Patent: Sep. 30, 2003

(54) METHOD FOR DISPLAYING BACKGROUND IMAGE IN MOBILE TELEPHONE

(75) Inventors: Woo-Sun Yoon, Kumi-shi (KR); Hoo-Ja Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/452,257

(22) Filed: Dec. 1, 1999

(30) Foreign Application Priority Data

Dec. 17, 1998 (KR) .......................................... 1998-55886

(51) Int. Cl.$^7$ ................................................. H04M 1/00
(52) U.S. Cl. ........................ 455/566; 455/575; 455/550; 379/93.17
(58) Field of Search ................................ 455/550, 566, 455/158.5, 158.4, 575, 95, 418, 419, 412; 345/592, 629, 864, 867, 751, 775, 764, 776, 777, 866, 146; 379/93.17, 428.04; 709/217, 200; 340/286.01, 286.02

(56) References Cited

U.S. PATENT DOCUMENTS

| | | | |
|---|---|---|---|
| 5,377,261 A | * 12/1994 | Baals et al. ............. | 379/201.04 |
| 5,642,185 A | * 6/1997 | Altrieth et al. ................ | 399/81 |
| 5,642,484 A | * 6/1997 | Harrison et al. ............... | 705/14 |
| 5,819,284 A | * 10/1998 | Farber et al. ................ | 709/203 |
| 5,870,683 A | * 2/1999 | Wells et al. ................. | 455/566 |
| 5,889,509 A | * 3/1999 | Sudo .......................... | 345/168 |
| 6,008,810 A | * 12/1999 | Bertram et al. ............. | 345/347 |
| 6,020,828 A | * 2/2000 | Gotou .................... | 340/825.44 |
| 6,044,248 A | * 3/2000 | Mochizuki et al. ......... | 340/7.47 |
| 6,211,858 B1 | * 4/2001 | Moon et al. ................. | 345/146 |
| 6,256,008 B1 | * 7/2001 | Sparks et al. ............... | 345/618 |
| 6,473,628 B1 | * 10/2002 | Kuno et al. ................. | 455/566 |
| 6,480,208 B1 | * 11/2002 | Eble et al. ................... | 345/807 |
| 2001/0014601 A1 | * 8/2001 | Kuwabara .................... | 455/412 |
| 2001/0029193 A1 | * 8/2001 | Ishigaki ...................... | 455/566 |

FOREIGN PATENT DOCUMENTS

| | | | |
|---|---|---|---|
| EP | 0831629 A2 | | 3/1998 |
| JP | 410276145 | * | 10/1998 |
| WO | 91/03885 | * | 3/1991 |
| WO | 01/50237 | * | 7/2001 |

OTHER PUBLICATIONS

European Search Report, EP 99 12 3781, Dec. 15, 2000.

* cited by examiner

*Primary Examiner*—Charles Appiah
(74) *Attorney, Agent, or Firm*—Dilworth & Barrese, LLP

(57) ABSTRACT

A method for displaying a background image in a mobile telephone that downloads background images from a computer, stores the downloaded background images in a memory, and displays a selected one of the stored background images. The method comprises displaying the selected background image for a predetermined time, in a background image display request condition; determining whether an urgent character message display condition has occurred while the background image is displayed; upon detection of the urgent character message display condition, stopping display of the background image and displaying the urgent character message; and upon detection of a normal character message display condition, continuing to display the background image, and after expiration of a predetermined time, displaying the normal character message.

6 Claims, 3 Drawing Sheets

METHOD FOR DISPLAYING BACKGROUND IMAGE IN MOBILE TELEPHONE

PRIORITY

This application claims priority to an application entitled "Method for Displaying Background Image in Mobile Telephone" filed in the Korean Industrial Property Office on Dec. 17, 1998 and assigned Serial No. 98-55886, the contents of which are hereby incorporated by reference.

BACKGROUND OF THE INVENTION

1. Field of the Invention

The present invention relates generally to a mobile communication terminal, and in particular, to a method for displaying a background image on a mobile telephone.

2. Description of the Related Art

With the increased popularization of mobile telephones, there are increasing demands for various convenient functions. For example, to increase its utility, a mobile telephone may have a phone book function, a short message service (SMS) function and a biorhythm service function.

As a further example, when desired, a background image may be formed on a display window of the mobile telephone so that the background image appears when the display window is back-lighted. Conventionally, the background image is formed by sticking a transparent-sticker type photograph to a LCD (Liquid Crystal Display) surface of the display window. This provides a permanent and unchangeable background to the LCD, possibly to the annoyance of the user. Furthermore, the sticker may damage the LCD. Finally, a dark portion of the background image may make a character message on the display window invisible.

SUMMARY OF THE INVENTION

It is therefore an object of the present invention to provide an improved method for downloading background images from a computer and displaying a selected one of the downloaded background images on a display in a mobile telephone.

In accordance with one aspect of the present invention, a method for displaying a background image in a mobile telephone comprises the steps of downloading background images from a computer and storing the downloaded background images in a memory; upon receipt of a background image select request, displaying in sequence the stored background images; and setting, when one of the background images is selected, the selected background image as a background image to be displayed.

In accordance with another aspect of the present invention, a method for displaying a background image in a mobile telephone which downloads background images from a computer, stores the downloaded background images in a memory, and displays a selected one of the stored background images, the method comprises the steps of displaying the selected image for a predetermined time, in a background image display request condition; determining whether an urgent character message display condition has occurred while the background image is displayed; upon detection of the urgent character message display condition, stopping the display of the background image and displaying the urgent character message; determining whether a normal character message display condition has occurred while the background image is displayed; and upon detection of a normal character message display condition, continuing to display the background image, and after expiration of a predetermined time, displaying the normal character message.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

In the preferred embodiment of the present invention, a mobile telephone downloads background images from a computer and displays a selected one of the background images on a display. To this end, a user can store image files of desired pictures and photographs in a memory of the computer using a scanner. The stored image files are downloaded to the mobile telephone by the connection shown in FIG. 1.

Figure 1:
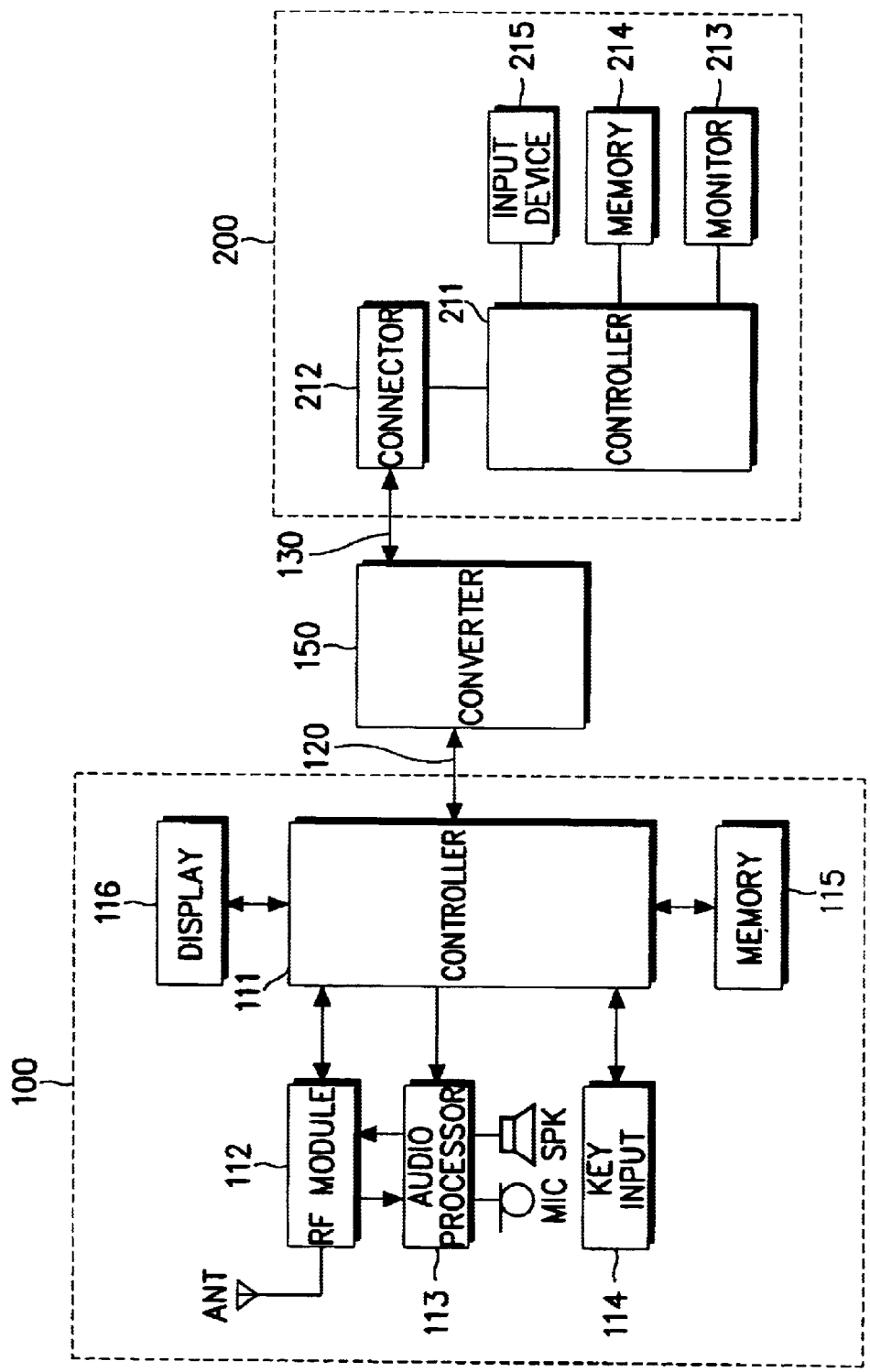
FIG. 1 is a block diagram illustrating the connection between a mobile telephone and a computer, for explaining how the mobile telephone downloads background images from the computer according to an embodiment of the present invention.

FIG. 1 shows the connection between the mobile telephone and the computer, for explaining how to download the background image files from the computer to the mobile telephone according to the preferred embodiment of the present invention. In FIG. 1, reference numeral 100 represents the mobile telephone and reference numeral 200 represents the computer. The mobile telephone is connected to the computer 200 through a converter 150 interposed between them.

With regard to the structure of the mobile telephone 100, a controller 111 controls the overall operation of the mobile telephone 100 and in particular controls the display of a background image according to the present invention. A RF (Radio Frequency) module 112 controls transmission and reception of audio data and control data. An audio processor 113, under the control of the controller 111, converts the audio data received from the RF module 112 to an audio signal provided to a speaker SPK, and converts an audio signal received from a microphone MIC to audio data, which is then provided to the RF module 112. A key input device 114, which includes a plurality of numeric keys and function keys, generates key data according to the user's key operation and provides the generated key data to the controller 111. A memory 115 includes a program memory for storing program data required in controlling operation of the mobile telephone, a data memory for storing data generated during operation of the mobile telephone, and a flash memory for storing background image files downloaded from the computer 200 according to an embodiment of the present invention. Preferably, the flash memory has a capacity of 1 to 4 Mbits. For example, a 4 Mbit flash memory can store about 36 background image files. A display 116, under the control of the controller 111, displays various messages and in particular displays a background image downloaded from the computer 200 according to an embodiment of the present invention. It is preferable to use a color LCD for the display 116 so as to display a color background image. The controller 111 is connected to the converter 150 through an IIC-BUS 120.

With regard to the structure of the computer 200, a controller 211 controls the overall operation of the computer 200 and in particular provides background images to the mobile telephone 100 according to the present invention. A connector 212 outputs data received from the controller 211 to the converter 150 and outputs data received from the converter 150 to the controller 211. A monitor 213 displays operation of the computer 200 in image and text, under the control of the controller 211. A memory 214 includes a program memory for storing a control program of the computer 200, a data memory and an auxiliary memory (e.g., hard disk drive). An input device 215 including a keyboard and a mouse, generates input signals according to the user's operation and provides the generated input signals to the controller 211.

The converter 150 is interposed between the mobile telephone 100 and the computer 200, converts data (including the background image files) output from the computer 200, and transmits the converted data to the mobile telephone 100. The converter 150 also converts data output from the mobile telephone 100 and transmits the converted data to the computer 200. The converter 150 is connected to the connector 212 in the computer 200 via a UART (Universal Asynchronous Receiver/Transmitter) BUS 130.

When the background image files are downloaded from the computer 200 to the mobile telephone 100, the controller 111 stores the downloaded image files in the flash memory of the memory 115. Thereafter, upon receipt of a background image select request form the user, the controller 111 sets a background image to be displayed by performing the procedure of FIG. 2, which will now be described.

Figure 2:
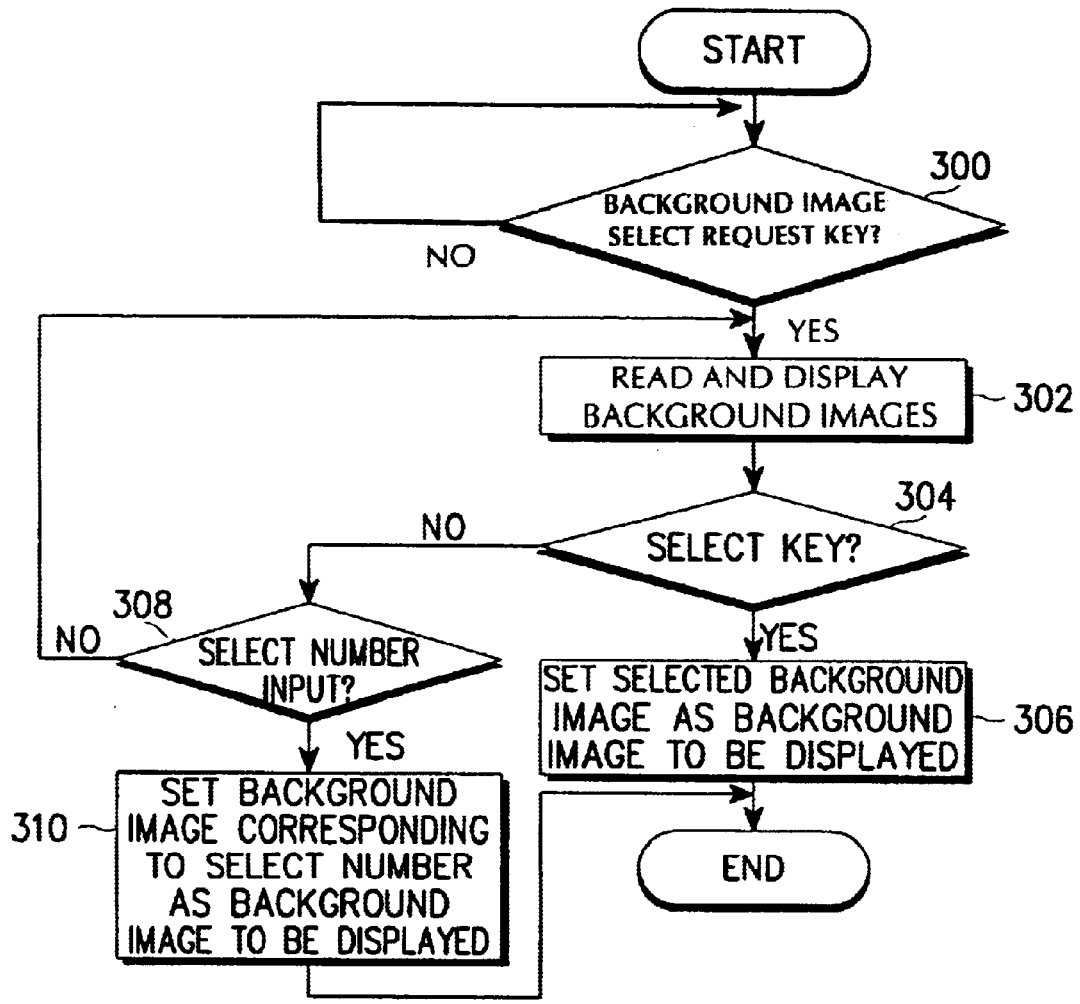
FIG. 2 is a flow chart illustrating a procedure for setting a background image to be displayed according to an embodiment of the present invention.

Referring to FIG. 2, the controller 111 of the mobile telephone 100 determines in step 300 whether the user has input a background image select request key. Upon detection of the background image select request key input, the controller 111 reads in sequence the background image files from the flash memory of the memory 115 and sequentially displays the read background images together with their associated select numbers on the display 116 for a predetermined time, in step 302. While displaying the background images, the controller 111 determines in step 304 whether or not a select key is input by the user. Upon detection of the select key, the controller 111 sets the selected background image as a background image to be displayed and stores the selected background image file, or data indicative of the selected background image file, in the flash memory of the memory 115, in step 306. If the select key is not detected in step 304, the controller 111 determines in step 308 whether a select number is input by the user. Upon detection of the select number, the controller 111 sets the background image corresponding to the select number as a background image to be displayed and stores the selected background image file, or data indicative of the selected background image file, in the flash memory of the memory 115, in step 310.

Figure 3:
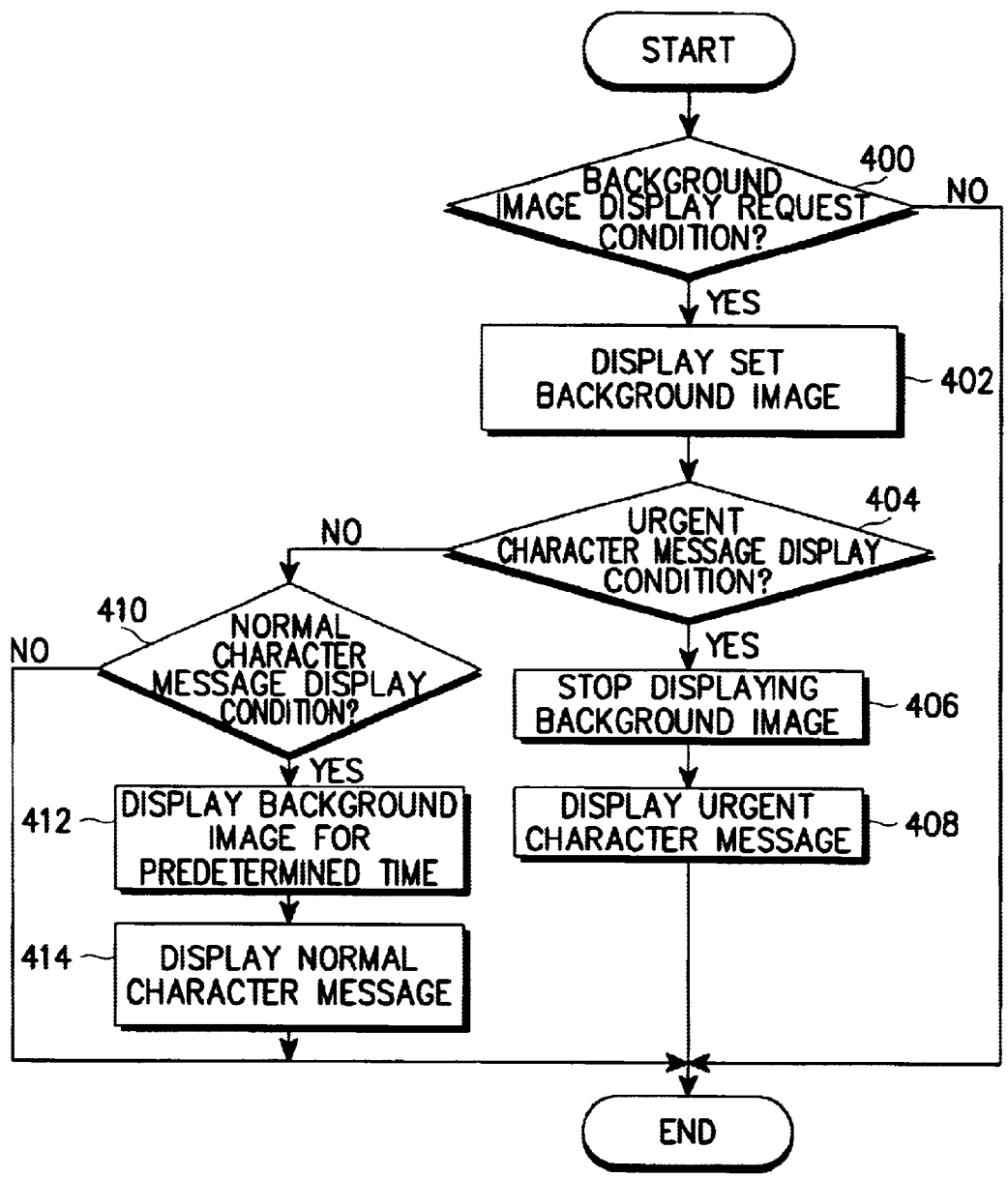
FIG. 3 is a flow chart illustrating a procedure for displaying a set background image according to an embodiment of the present invention.

After setting the background image, the controller 111 displays the set background image on the display 116 in accordance with the control procedure of FIG. 3. Referring to FIG. 3, the controller 111 of the mobile telephone 100 determines in step 400 whether a background image display request condition exits. For example, the background image display request condition occurs when a short message is received, or when the user presses a background image display request key, opens a flip of the mobile telephone to make a call, or turns on the mobile telephone. Upon detection of the background image display request condition, the controller 111 in step 402 displays on the display 116 the background image set by the procedure illustrated in FIG. 2 for a predetermined time.

While the background image is displayed, the controller 111 determines in step 404 whether an urgent character message display condition exists, indicative of an urgent character message to be displayed immediately. If the condition exits, the controller 111 stops displaying the background image in step 406, and displays the urgent character message on the display 116 in step 408. The control procedure then comes to an end. For example, the urgent character message display condition occurs when the user inputs (presses) a function key, a numeric key or a display end request key while the background image is being displayed after the flip is opened.

If the urgent character message display condition does not exist in step 404 and the background image is still being displayed, the controller 111 determines in step 410 whether a normal character message display condition exists, indicative of a character message to be displayed normally. If the condition exits, the controller 111 displays the present background image until expiration of a predetermined time, in step 412. Thereafter, in step 414, the controller 111 displays the normal character message on the display 116 in step 414. For example, the normal character message includes initial character messages displayed upon power on. In addition, the normal character message may include a received short message.

The background image display request condition of step 400 may be pre-programmed. It is also contemplated that it may be set by the user of the mobile phone from a plurality of predetermined events for triggering the condition. Similarly, the urgent character message display condition of step 404 may be pre-programmed, and may also be set from a plurality of events for triggering the urgent character message display condition. So too the normal character message display condition may be pre-programmed, and may also be set from a plurality of events for triggering the normal character message display condition.

As described above, the mobile telephone of the present invention downloads background image files from the computer, and selectively displays a desired background image on the display.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for displaying a background image in a mobile telephone, comprising the steps of:
   (a) downloading background images from a computer and storing the downloaded background images in a memory of the mobile telephone;
   (b) upon receipt of a background image select request, displaying in sequence the stored background images;

(c) setting, when one of the stored background images is selected, the selected background image as a background image to be displayed;

(d) continuing to display the background image for a predetermined time when a normal character message display condition has occurred, and after a lapse of the predetermined time, displaying the normal character message; and (e) stopping the display of the background image when an urgent character message display condition has occurred.

2. The method as claimed in claim 1, wherein step (b) comprises the step of displaying the stored background images together with associated select numbers, and step (c) comprises the step of, upon detecting the selection of one of the select numbers, setting a stored background image corresponding to the detected select number as a background image to be displayed.

3. The method as claimed in claim 1, further comprising the step of displaying the set background image for a predetermined time.

4. A method for displaying a background image in a mobile telephone that downloads background images from a computer, stores the downloaded background images in a memory, and displays a selected one of the stored background images, the method comprising the steps of:

displaying the selected background image for a predetermined time, in a background image display request condition;

determining whether an urgent character message display condition has occurred while the background image is displayed;

upon detection of the urgent character message display condition, stopping the display of the background image and displaying the urgent character message;

determining whether a normal character message display condition has occurred while the background image is displayed; and upon detection of a normal character message display condition, continuing to display the background image, and after a lapse of a predetermined time, displaying the normal character message.

5. The method as claimed in claim 4, wherein the urgent character message display condition occurs when the user inputs a function key, a numeric key or a display end request key while the background image is displayed after a flip or a folder of the mobile telephone is opened.

6. The method as claimed in claim 4, wherein the normal character message display condition occurs when initial character messages are displayed upon a power-on condition or upon receiving a short message.

* * * * *